Dec. 3, 1940.   S. ELLIS   2,223,360
SUBIRRIGATING SEED AND TRANSPLANTING FLAT
Filed July 11, 1939   2 Sheets-Sheet 1
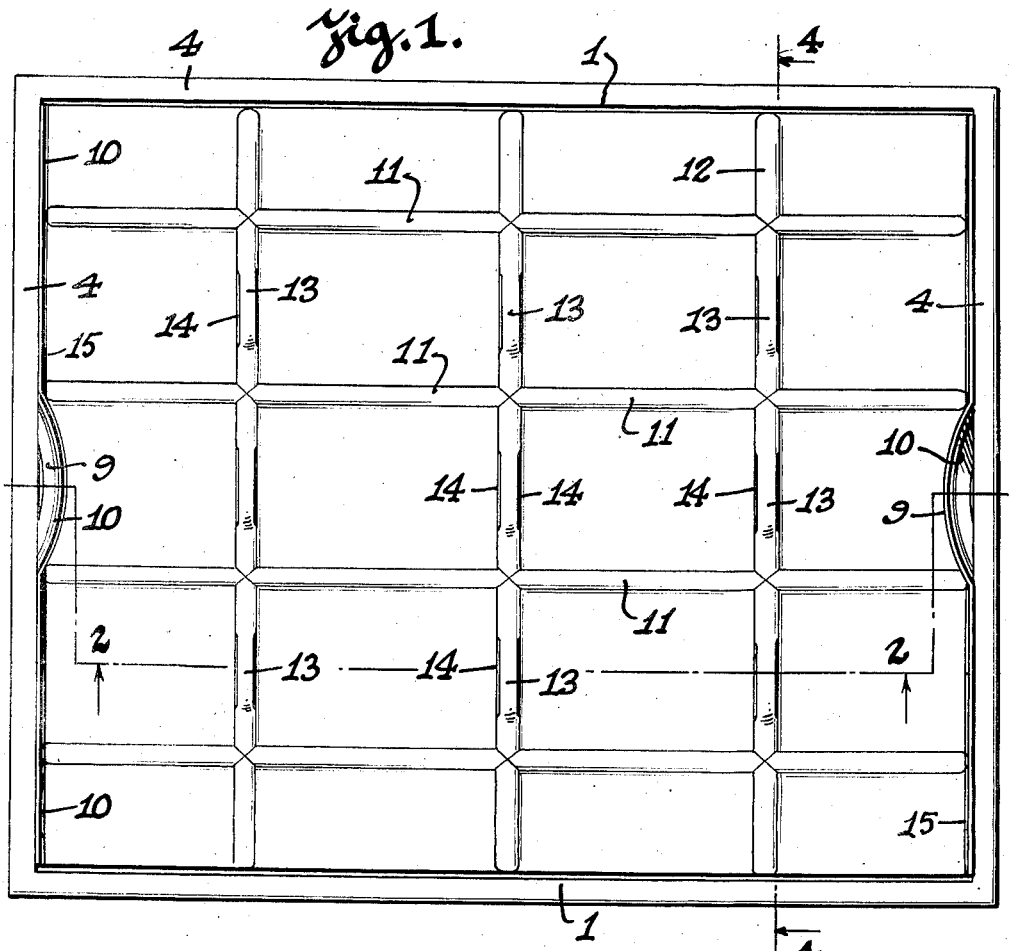
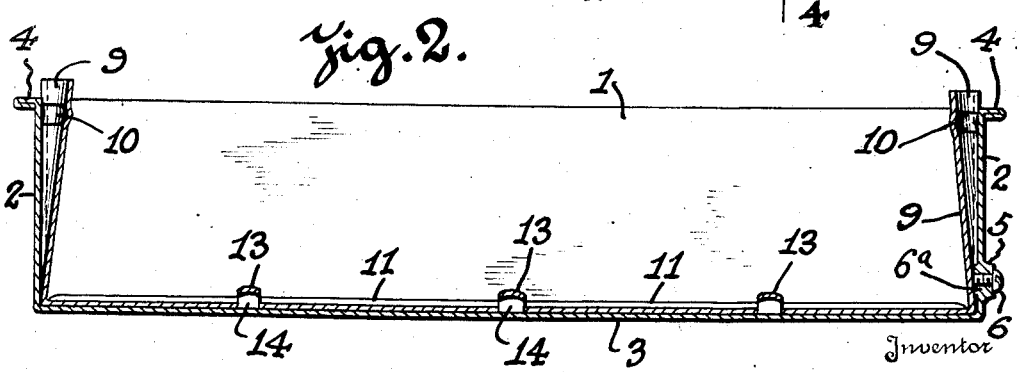
Inventor
Stuart Ellis,
By Lester L. Sargent
Attorney Dec. 3, 1940.  S. ELLIS  2,223,360
SUBIRRIGATING SEED AND TRANSPLANTING FLAT
Filed July 11, 1939  2 Sheets-Sheet 2
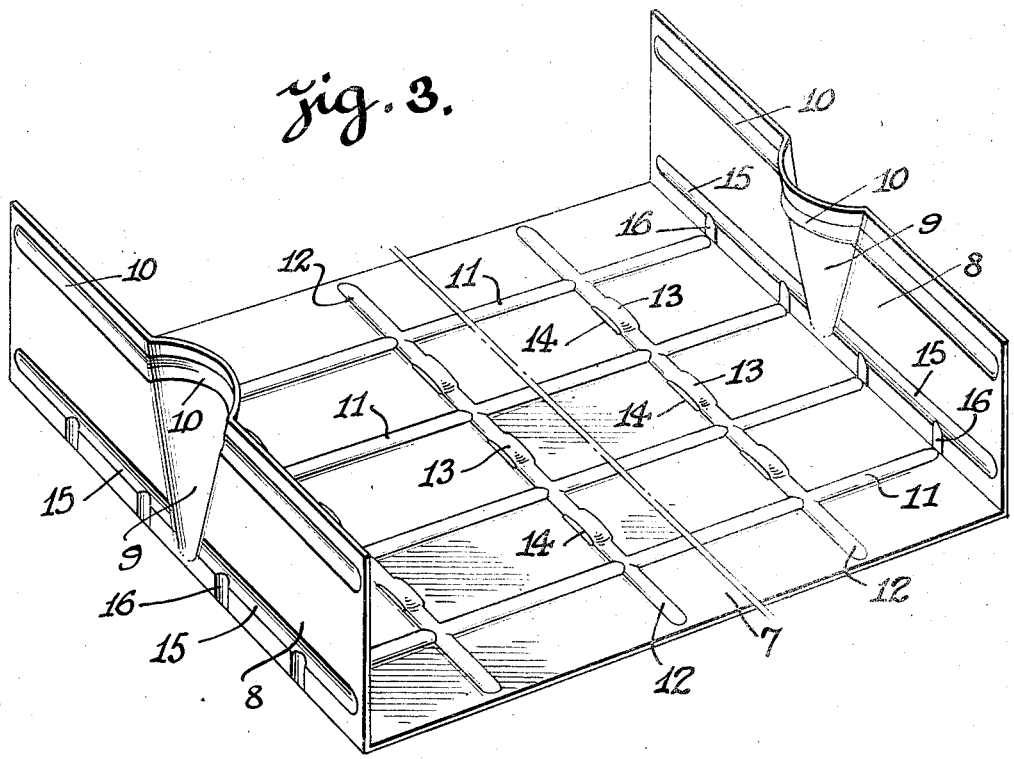
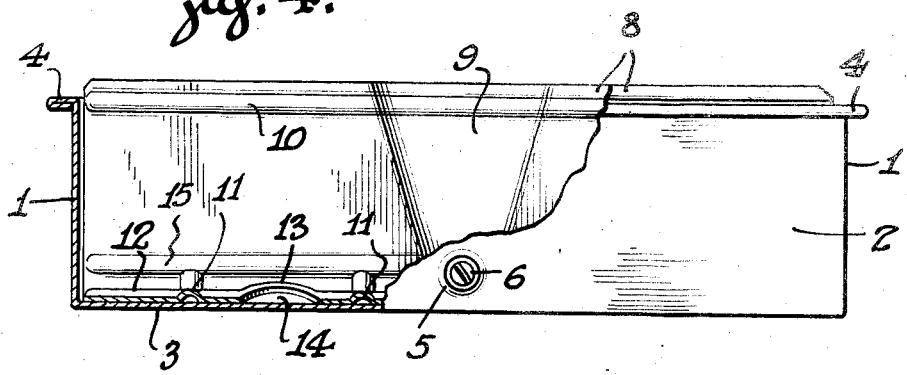
Inventor
Stuart Ellis.
By Lester L. Sargent
Attorney Patented Dec. 3, 1940

2,223,360

UNITED STATES PATENT OFFICE 2,223,360

SUBIRRIGATING SEED AND TRANSPLANTING FLAT

Stuart Ellis, Fredericksburg, Va.

Application July 11, 1939, Serial No. 283,904

4 Claims. (Cl. 47—38)

The object of my invention is to provide a subirrigating seed and transplanting flat having novel means for supplying uniform moisture to the earth at the bottom of the seed flat, and for circulating air to the bottom of the box whereby to insure the successful growth of the seeds planted, or of the small plants, if the flat is used for transplanting purposes.

It is also an object of my invention to provide a similar construction for flower boxes.

I attain these and other objects of my invention by the device illustrated in the accompanying drawings, in which—

Figure 1 is a top plan view of the invention;

Fig. 2 is a section through same on line 2—2 of Fig. 1;

Fig. 3 is a perspective view of the removable plate which is seated on the bottom of the flat; and Fig. 4 is a view partly in section and partly in end elevation of the invention.

Like numerals designate like parts in each of the several views.

I provide a preferably square and preferably metal flat or box having sides 1, ends 2, and bottom 3. At the central lower portion of one of the ends of the flat I provide a threaded enlargement or hub 5, in which is mounted a short blunt-ended screw 6 which projects only slightly through the end of the flat and which may be removed when desired to provide a drain 6a. I provide a removable irrigating and ventilating preferably metal plate 7 of approximately the same area as the bottom 3 of the flat and having upturned ends 8. The ends 8 which have a vertical somewhat V-shaped or tapering inwardly pressed portions or channels 9 to receive water. Each of the ends 8 also have transverse grooves 15 in communication with channels 9. The grooves 15 in turn are in communication with grooves 16 which are aligned with and communicate with grooves 11. Plate 7 has its bottom portion provided with longitudinally extending raised grooves 11 and transversely raised grooves 12 pressed slightly upward at their central portions 13 and having lateral slots 14 for the inflow of water from the grooves 12 to the earth resting on the flat, from which moisture is absorbed by the roots of the plants.

Each of the ends 8 are provided with crimps 10 to stiffen the ends and to facilitate grasping the plate to insert or remove it from the box or flat, and which also frictionally holds the plate in place in the box.

In use, the water is poured into the channels 9 at the end of the flat and thence flows through grooves 15 to grooves 16 and thence to the channels or corrugations 11 and 12 and escapes through the lateral openings 14 into the earth in the flat, giving it the necessary moisture which is thus evenly distributed and which is gradually sucked up by the roots of the plants. When the moisture rises to the surface, the flat is then properly moistened and will need no more water for a week or ten days. Tiny seeds are not disturbed as they are when watered from above regardless of how carefully the watering is done. Transplanted seedlings are not uprooted but are left uninterrupted in their task of re-establishing a root system. With this device there is an increase in the percentage of germination and less danger of damping off, as often results from improper watering.

Also, the channels 9 and grooves 16, 15, 11 and 12 permit of air circulation through the end passages and beneath the flat. The provision of the slots 14 laterally of the raised portion 13 prevents the earth from clogging the passages through which the water enters and allows the water to flow out on a flat surface.

The screw 6 may be removed if it is desired to drain off the flat because of too much water.

The box may be either square or rectangular and of any desired proportions.

What I claim is:

1. In a subirrigated seed and transplanting flat, the combination of a metal box, a corrugated metal plate seated in the bottom of the box and having upturned ends engaging the ends of the box, spaced portions of the corrugations of the metal plate being pressed upwardly and having a series of lateral openings for the passage of water laterally from said corrugations at various portions to the earth in the box, said upturned ends also having channels for the flow of water to the bottom of the box.

2. In a subirrigated seed and transplanting flat, the combination of a box, a corrugated plate seated in the bottom of the box and having upturned ends engaging the ends of the box, portions of the corrugations being pressed upwardly and having a multiplicity of lateral openings positioned over the main portion of the corrugated plate and spaced from its edges for the passage of water to the earth in the box, said upturned ends also having channels communicating with the aforesaid corrugations for the flow of water to the bottom of the box.

3. In a subirrigated seed and transplanting flat, the combination of a box of the shape described, a corrugated plate seated in the bottom of the box and having upturned ends engaging the ends of the box, said ends also being crimped near their top portions to facilitate removal and insertion of the plate, portions of the corrugations in the bottom of the plate being pressed upwardly and said corrugations having slots for the passage of water to the earth in the box, said upturned ends also having tapered channels for the flow of water to the bottom of the box, and transverse grooves communicating with said channels.

4. In a subirrigated seed and transplanting flat, the combination of a box, a longitudinally and transversely inversely grooved plate seated in the bottom of the box and having upturned ends engaging the ends of the box, said ground portions of the plate having spaced slots spaced from the edges of the plate for the passage of water to the earth in the box, said upturned ends also having channels communicating with the aforesaid grooves for the flow of water to the bottom of the box.

STUART ELLIS.